Oct. 5, 1965  B. A. LAGANA, JR  3,210,070
AUTOMOBILE BODY REPAIR TOOL
Filed June 3, 1963  3 Sheets-Sheet 1
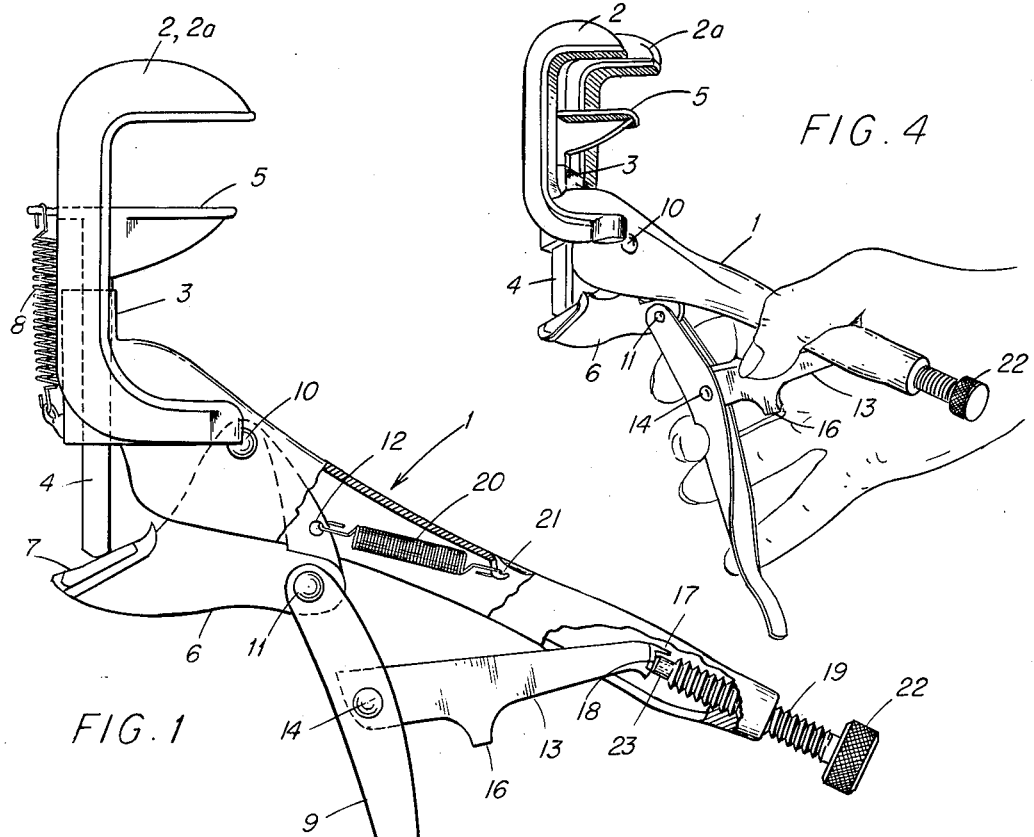
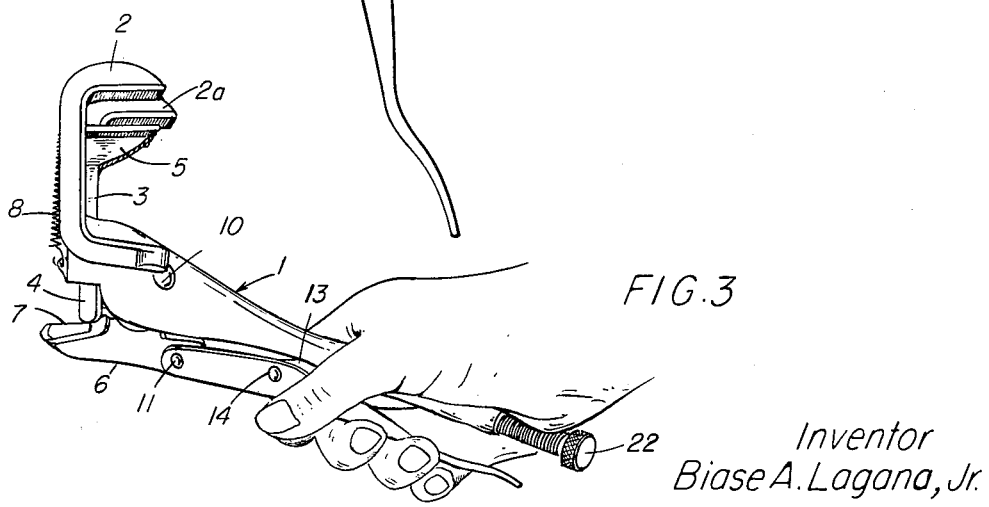
Inventor
Biase A. Lagana, Jr.
By his attorneys
Howson and Howson

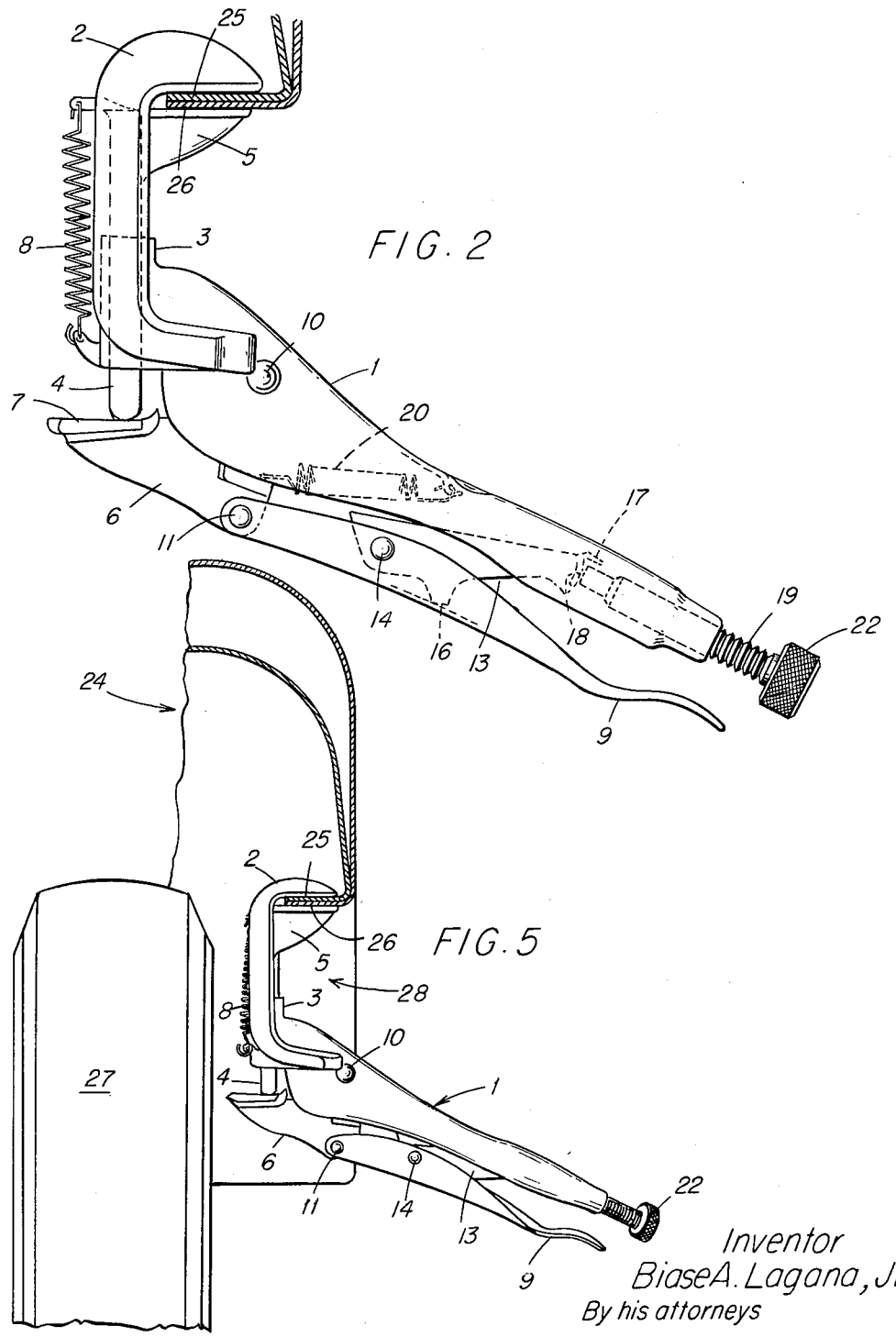

Oct. 5, 1965  B. A. LAGANA, JR  3,210,070
AUTOMOBILE BODY REPAIR TOOL
Filed June 3, 1963  3 Sheets-Sheet 3
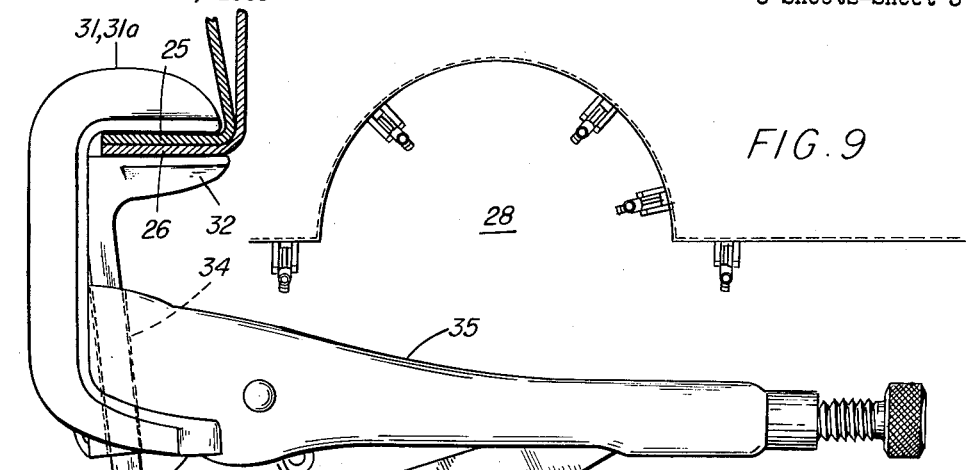
FIG. 9
FIG. 6
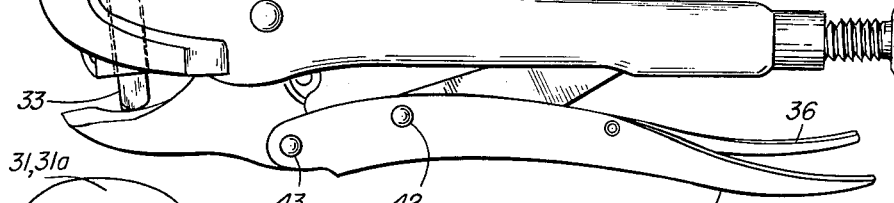
FIG. 7
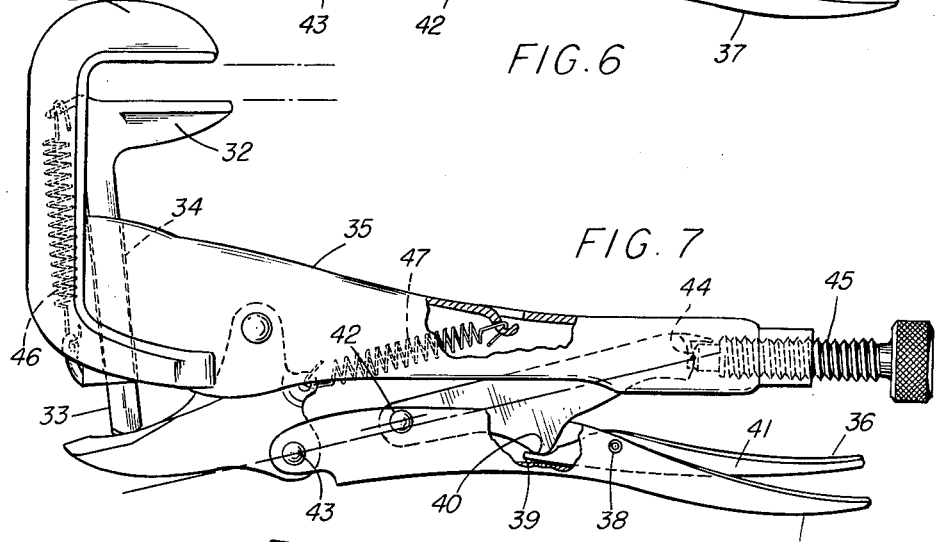
FIG. 8
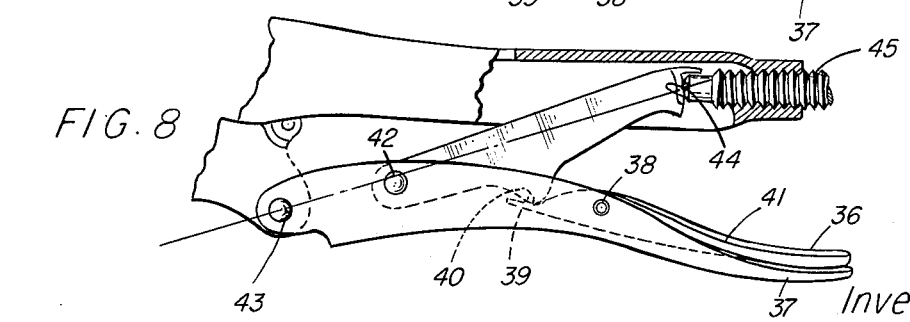
Inventor
Biase A. Lagana, Jr.
By his attorneys
Howson and Howson United States Patent Office 3,210,070
Patented Oct. 5, 1965

3,210,070
AUTOMOBILE BODY REPAIR TOOL
Biase A. Lagana, Jr., 137 Lyons Road, Scarsdale, N.Y.
Filed June 3, 1963, Ser. No. 284,947
7 Claims. (Cl. 269—228)

This invention relates to a tool suitable for an automobile body repair and in particular to a locking wrench of the vise grip type suitable for use in temporarily holding the center section of a rear quarter panel or part thereof to an automobile body.

The rear quarter panel of an automobile is generally attached to the body by means of edges at the wheelhouse opening. There is a supporting metal edge at the curved bottom of the panel around the wheelhouse. The wheelhouse has a similar edge. To repair such a panel or part thereof it is often necessary to remove the panel from the wheelhouse and when it is repaired, of course, to reconnect it to the wheelhouse.

Reconnecting the panel to the lining generally involves joining a bottom strip of the panel to a bottom edge of the wheelhouse both being turned inwardly to form two adjacent strips or edges parallel to the ground. The edges of the panel and lining thus face inwardly toward the tire. While these strips are being held together in this position by tools, they are permanently connected by spot welding or riveting one to the other.

In the past, in order to hold these inwardly facing edges together for riveting or spot welding, it has been necessary to either remove the rear tire or to raise the body of the car until the bottom edge of the panel clears the tire. This was due to the fact that the tools needed more room than was available between the tire and the panel.

Removing the tire or raising the body of the car until the tire is out of the way to get the needed space are time consuming jobs. In addition, raising the body disturbs the proper positioning of the panel. Thus, both removing the tire and raising the car body, have drawbacks. It is desirable to avoid having to do either one.

It is one object of this invention to provide a tool which will clamp a rear quarter panel of a car to the wheelhouse without interfering with the tire, thus obviating the need for its removal or for raising the car body to provide clearance.

It is still another object of this invention to provide a tool for clamping the rear quarter panel of a car to the wheelhouse which tool does not interfere with the tools for riveting or spot welding of the panel to the framework.

Various other objects and advantages will appear from the description, hereinafter, of two embodiments of the invention.

The invention provides a vise wrench having reverse or rearward facing jaws above the center line of the handle.

The precise structure of the wrench together with the mechanics of its operation will be described hereinafter in connection with the drawings of which:

FIG. 1 is a view in side elevation of one embodiment of my novel wrench in an open position partially broken away to show certain interior elements.

FIG. 2 is a view in side elevation similar to FIG. 1 showing the embodiment of that figure with the tool in closed position gripping the work.

FIG. 3 is a view in perspective showing the relationship of the embodiment of FIG. 2 in the closed position to the hand which operates it.

FIG. 4 is a perspective view similar to FIG. 3 showing the same hand and embodiment with the tool in an open position.

FIG. 5 is a front view in cross section of a wheel, wheelhouse and panel of an automobile showing in elevation the embodiment of FIG. 1 in its clamped position and indicating the relative spacing between the rear quarter panel and the tire with the latter in its normal position.

FIG. 6 is a view in side elevation showing the preferred embodiment of the invention in which the reverse jaws of the wrench are parallel the lengthwise axis or handle of the wrench.

FIG. 7 is a view in side elevation showing part of the preferred embodiment, partially broken away, to indicate the position of the component parts in the locked position.

FIG. 8 is a fragmentary view showing the embodiment of FIG. 7 in an unlocked position.

FIG. 9 is a view in elevation taken from the side of the automobile showing several of my tools of the preferred embodiment in place opposite and near the wheelhouse.

It must be remembered that to hold the edges at the wheelhouse a plurality of tools must be locked on as shown in FIG. 9 and left there while the operator uses the riveting or welding tools. However, I will first describe a single locking tool.

In FIGS. 1 to 5 a locking wrench according to one embodiment of the invention is shown. There is a vice grip wrench and my reverse jaws spaced above the wrench proper. The wrench has a handle 1 and there are three reverse or rearward facing parallel jaws 2, 2a and 5 attached to the front end of the handle 1. The jaws are spaced above the handle. Jaws 2 and 2a are permanently connected in a fixed position on opposite sides of the handle 1 above the locking wrench. Jaw 5 is between jaws 2, 2a and is movable. Also between jaws 2 and 2a is a channel member 3 permanently mounted on the front end of handle 1 perpendicularly to the jaws 2, 2a and 5. It is adapted to carry a support member 4 for the movable jaw 5. Support member 4 is permanently and rigidly connected at right angles to jaw 5, and is adapted to slide up and down in channel member 3. Its bottom is slightly curved. It will be noted that the support member 4 does not extend beyond the end of the handle. Thus it does not extend into the wheelhouse 24 or interfere with the wheel 27. The jaws are also above the handle.

The object to be gripped by this embodiment of the wrench is placed between jaws 2, 2a on one side and jaw 5 on the other. It will be seen that this jaw arrangement accommodates itself to the curvature of the wheelhouse opening 28 without deforming the edges 25, 26 of the wheelhouse 24 and the panel to be attached.

The mechanism for moving jaw 5 to enable the wrench to grip an object includes a cam 6 pivotally mounted in handle 1 at a pivot 10 spaced rearward from channel member 3. Cam 6 has a forward extending curved surface 7 slidably engaging support 4. When cam 6 is rotated clockwise about pivot 10 surface 7 causes an upward movement of support 4 and jaw 5. In this way the wrench grips any object between its jaw 2, 2a and 5. The curved surfaces of support 4 and surface 7 prevent their binding as cam 6 moves support 4 vertically. Connected between one end of jaw 5 and the bottom of channel 3 is a tension spring 8 for keeping support 4 in engagement with cam surface 7. Also, this spring 8 urges jaw 5 to its furthest open position.

Cam 6 is operated by a channel shaped handle lever 9 pivotally connected to the handle 1 of the wrench. The connection is near the jaws of the wrench at a pivot 11. There is a tension spring 20, one end of which is connected to it at a point 12 intermediate pivots 10 and 11. The other end of tension spring 20 is connected to handle 1 at a point 21. Spring 20 tends to rotate cam 6 counterclockwise. Operating lever 9 acts as a toggle to rotate cam 6 clockwise and is pivotally engaged intermediate its ends by a toggle link 13 at a pivot 14. Toggle link 13 is pivotally restrained from swinging beyond an acuate angle with lever 9 by an upstanding rest 16 at the middle of the toggle link 13 engaging lever 9. The other end of toggle link 13 in the handle has a lip 17 and an abutting surface 18, which end is placed in the handle 1 and adapted to move along the lengthwise axis of the handle.

In the free end of handle 1 i.e. opposite to the channel 3 end, and adjacent the free end of link 13, is a threaded machine screw 19. It has a knurled head 22 at the outer end, and an unthreaded cylindrical portion 23 at the inner end. Screw 19 meshes with the end of handle 1 so that when knurled head 22 is turned clockwise the screw 19 advances into the handle 1. The lip 17 of link 13 fits underneath the cylindrical portion 23 of screw 19 and surface 18 abuts the portion 23 end of screw 19.

Having described the various elements of one embodiment of the visegrip or locking wrench, its function and operation may now be easily understood. Lip 17, abutting surface 18 and tension spring 20 combine to prevent toggle link 13 from being separated from screw 19. The tension in springs 20 and 8 rotates cam 6 counterclockwise and causes handle lever 9 to push surface 18 of toggle link 3. This, in turn, pushes abutting surface 18 against the portion 23 end of screw 19. Lip 17 is therefore, confined underneath portion 23 preventing toggle link 13 from being separated from screw 19.

The position of abutting surface 18 lengthwise of the handle 1 is determined by the position of screw 19. When the screw 19 is advanced into handle 1 it carries abutting surface 18 with it. When it is withdrawn from handle 1 surface 18 follows it due to the action of springs 8 and 20.

To make the wrench grip and lock closed on an object, operating lever 9 is drawn towards handle 1. As lever 9 is moved, pivots 10, 11, 14, and the pivot point at which abutting surface 18 meets screw 19 go into operation. Toggle link 13 moves about pivot 14 and the point at which surface 18 meets screw 19. Operating lever 9 moves about pivots 11 and 14, and cam 6 moves about pivot 10 and 11. Also, pivots 11 and 14 move in an arc about pivots 10 and the point at which surface 18 meets screw 19, respectively. This latter pivot point is stationary. As operating lever 9 approaches handle 1 and cam 6 it rotates clockwise. This, as stated hereinbefore, raises jaw 5 and closes the wrench causing it to grip any object between its jaws.

The wrench reaches its fully closed position when cam 6 is rotated clockwise as far as possible. This occurs for a given position of screw 19 when the pivots of lever 9 and toggle link 13 form a straight line. Thus, when pivot 11, pivot 14 and the point at which surface 18 meets screw 19 define a straight line, the wrench is fully closed. It will also be seen that the wrench's fully closed position differs for each different position of screw 19. When screw 19 is advanced into handle 1 jaws 2, 2a and 5 are held closer together than when it is retracted. Thus screw 19 serves to adjust the fully closed setting of jaws 5.

FIG. 2 shows the locked position of the wrench.

The wrench may be locked in a fully closed position by drawing operating lever 9 even closer to handle 1 than it is when the pivots of handle 9 and toggle link 13 are in a straight line. This causes pivot 14 to approach handle 1 even further. However, after pivot 14 moves a little bit in that direction, upstanding rest 16 engages operating lever 9. This prevents further movement of pivot 14 toward handle 1 by effectively making operating lever 9 and toggle link 13 into a rigid bar anchored at both ends. The force exerted by the jaws on the object being gripped is transmitted back through operating lever 9 and toggle link 13, but the direction of the force is on a straight line between pivot 11 and the point at which surface 18 and screw 19 meet. Since pivot 14 is inside this line, namely closer to the handle 1 than the line, it is driven toward the handle 1. It is prevented from moving in that direction however, by rest 16. Thus, the wrench is locked.

To open the wrench, the end of operating lever 9 is lifted away from handle 1 until pivot 14 again passes through its straight line (fully closed) position. Once past this position the gripping force transmitted back through the operating lever 9, and the force of springs 8 and 20 will open the wrench the rest of the way.

FIGS. 3 and 4 show how a locking wrench, according to this first embodiment of the invention, is held in the hand when in a locked position and an open position, respectively. FIG. 5 illustrates how this embodiment clamps the lower edge of the automobile panel to its supporting lining without interfering with the tire. The handle 1 extends away from the tire and panel, and slopes downwardly a little at an inclined angle. It will be seen that handle 1 extends away from the main body of the car.

Sometimes a part of the wheelhouse opening 28 has to be replaced and a new lower edge put in. The tool is equally adapted for this purpose. The tool can also be used at the edges just beyond the wheelhouse opening as shown in FIG. 9.

It will be noted that while the fixed jaws need no means to move them a cam means has to be provided to move the movable jaw to and from locking position. The motion should be a straight line motion in order not to disturb the relation of the two edges 25, 26 to be gripped. For this purpose the cam 6, which itself has a rocking motion, has curved surface 7 engaging the curved end of support member 4 and therefor transmits straight line motion as the two curves move with relation to each other. The cam 6 may extend a little beyond the end of the handle but in any case the jaws will at least partially overlie the handle. Preferably they are entirely above the handle.

A preferred embodiment of my invention is shown in FIGS. 6 to 9. In this embodiment the handle extends at almost exactly 180° to the jaws. With this modification the handle of the tool when locked in position extends parallel to the ground and keeps the tool more fully out of the way of the wheel opening 28, the equipment needed to weld or rivet the edges 25, 26, and the tire 27.

In this embodiment the support member 33 carrying the movable jaw 32 and the channel 34 in which it moves are not perpendicular to the fixed jaws 31, 31a and movable jaw 32. The angle included between the jaws and the support member is acute. Thus the upper end of the support member is further toward the end of the handle 35 then the lower end. In this way mechanical advantages are obtained and the tool does not extend inwardly of the jaws despite the increased angle of the tool relative to the wheelhouse opening 28. The jaws are still over the end of the handle and the surface which raises the support member 33 is set back further under the jaws and curved differently.

In this embodiment we have shown a lever 36 added to the operating lever 37 as set forth in FIGURES 7 and 8. This lever 36 is associated with the operating lever 37 at a pivotal point 38 to assist in opening the tool by leverage which brings the operating lever past dead center. For this purpose there is a lip 39 at the forward end of the lever 36 upon which an upstanding rest 40 bears when the wrench is in locked position. There is a longer portion 41 of lever 36 extending from pivot point 38 to the free end of the operating lever 37. This pivot 38 is so positioned that when rest 40 bears on lip 39 portion 41 of the lever is some distance away from operating lever 37 at its free end.

To make the angle included between the jaws and the support member 34 acute the channel 34 is mounted at the front end of handle 35 at a different angle than in the first embodiment which in connection with the instructions previously described gives the desired result of keeping the tool even more completely out of the way of the mechanic and his welding or riveting tools and the wheelhouse generally.

The locked position of the preferred embodiment of the invention is shown clearly in FIG. 7. The wrench is designed to lock as in the first embodiment when pivot 42 is closer to handle 35 than the straight line joining pivot 43 with the point where abutting surface 44 meets screw 45. In this position it should be clear that upstanding rest 40 bears upon lip 39 and lever 37 and prevents pivot 42 from moving closer to handle 35.

To unlock the wrench, portion 41 of lever 36 is drawn toward operating lever 37. By lever action this pushes rest 40 away from operating lever 37, moves lever 37 and hence moves pivot 42 across the straight line joining pivot 43 with the point where abutting surface 44 meets screw 45. This new position is clearly shown in FIG. 8. No further work is needed to open the wrench as the tension springs 46 and 47 will open it the rest of the way. The preferred embodiment of the invention is easier to open than the first embodiment because lever 36 gives a mechanical advantage which reduces the force needed to open it.

The locking and unlocking on the two sides of the dead center line of the three pivots in FIGS. 7 and 8 can also be used in the embodiment of FIGS. 1 to 5.

The handle and operating lever of the wrench act as a toggle means when participating in moving the wrench parts to closed position. The cam means operating the toggle means includes the cam which contacts the support member.

It is important to note that the movable jaw must be moved to gripping position by a motion parallel to the fixed jaw. Otherwise one of the two edges 25, 26 may be moved with relation to the other. If this occurs the edges are clamped in a different position from normal. The neighboring tool will not correspond in its action and the edges will be welded or riveted improperly. It will be seen that this parallel movement is a crucial one in view particularly of the plurality of tools required.

While particularly suitable for automobile body repair the tool may be useful in similar situations in other vehicles.

It will be understood that various changes in the details, materials and arrangement of parts described and illustrated herein in order to explain the nature of the invention, may be made by those skilled in the art within the principles and scope of the invention.

What is claimed is:

1. A tool suitable for automobile body repair comprising a vise grip type wrench having a handle and at least two jaws both located above the handle facing in the reverse direction back over the handle, one jaw being a fixed distance above the handle and the other a movable distance above the handle, in combination with toggle means associated with the handle and adapted to participate in moving the movable jaw from open to closed position by a movement parallel to the fixed jaw.

2. A tool suitable for automobile body repair comprising a toggle-operated locking wrench having a handle, toggle means associated with handle to open and close the wrench, at least two jaws both located above the handle and facing in the reverse direction back over the handle in a direction lengthwise of the handle, one jaw being a fixed distance and the other a movable distance above the handle, in combination with cam means connected to and operated by the toggle means adapted to lock the movable jaw in closed position by a movement parallel to the fixed jaw.

3. A tool suitable for automobile body repair according to claim 2 which there are two jaws side by side a fixed distance above the handle facing downwardly toward the handle, in combination with a single jaw between the two fixed jaws but facing upward away from the handle; whereby the tool adapts itself to the curvature of the work such as a wheelhouse opening.

4. A pair tool suitable for temporarily locking the rear panel of an automobile to a wheelhouse opening while welding or riveting the panel to the opening comprising a locking wrench having a handle, an operating lever pivotally associated with the handle, at least two parallel jaws both located above the handle facing in the reverse direction back over the handle, one jaw being a fixed distance above the handle facing toward the handle and the other opposed to the fiixed jaw facing away from the handle, both jaws being parallel to the handle at a fixed angle to it, and a rigid support on one end of which the movable jaw is mounted, in combination with a channel parallel to said support and mounted in the handle, said support being slidable in the channel and a cam connected to the operating lever for advancing the support and jaw toward locking position, and spring return means for unlocking the wrench.

5. A tool suitable for automobile body repair according to claim 4, in which the support for the movable jaw is at an included angle with the jaw of less than 90°; whereby the tool does not extend beyond the jaw despite the increased angle of the handle to the work and the cam is also set back further under the jaws.

6. A tool suitable for automobile body repair comprising a toggle-operated locking wrench having a handle, and operating lever pivotally associated with the handle and below same, a toggle lever associated therebetween in pivoted relation with the handle and the lever, at least two jaws both above the handle facing in the reverse direction back over the handle in a direction lengthwise of the handle, one jaw being a fixed distance above the handle and the other a movable distance, in combination with pivots connected to and operated by the handle, operating lever and toggle lever, the pivotal connections between said three elements being such that when the tool is locked the middle pivot will be on one side of a dead center line between the two outer pivots and when unlocked the middle pivot will be on the other side of such line.

7. A tool suitable for automobile body repair according to claim 5 in which the middle pivot in the pivot joining the operating lever to the toggle lever.

References Cited by the Examiner
UNITED STATES PATENTS

| | | | |
|---|---|---|---|
| 1,242,436 | 10/17 | Greenhaw | 269—6 |
| 2,514,130 | 7/50 | Jones | 269—288 X |
| 2,815,728 | 12/57 | Fenimore | 269—228 |

ROBERT C. RIORDON, *Primary Examiner.*